May 11, 1926.  1,584,308
E. KONIK
GEAR CUTTING MACHINE
Filed Feb. 10, 1925   3 Sheets-Sheet 1
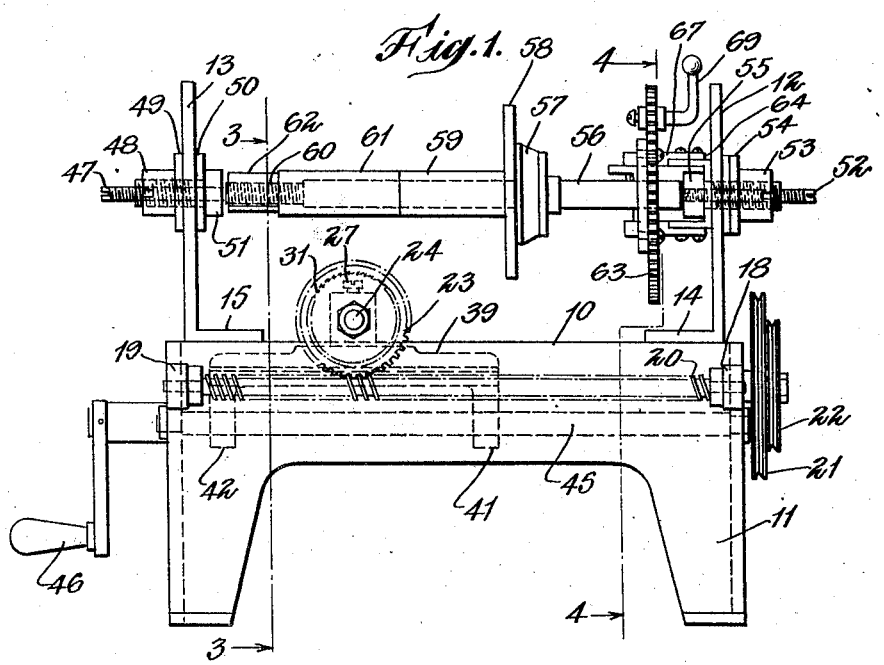
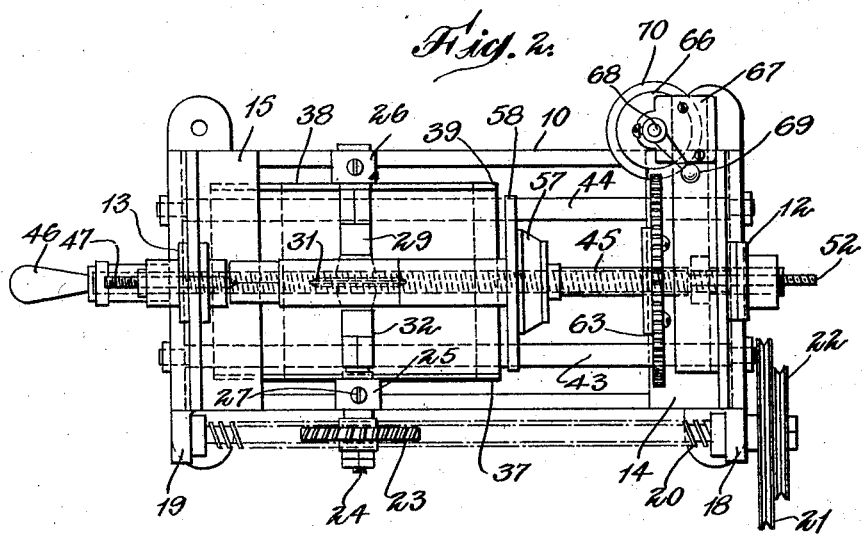
Inventor
Edward Konik
By his Attorney May 11, 1926.  
E. KONIK  
1,584,308  
GEAR CUTTING MACHINE  
Filed Feb. 10, 1925  
3 Sheets-Sheet 2
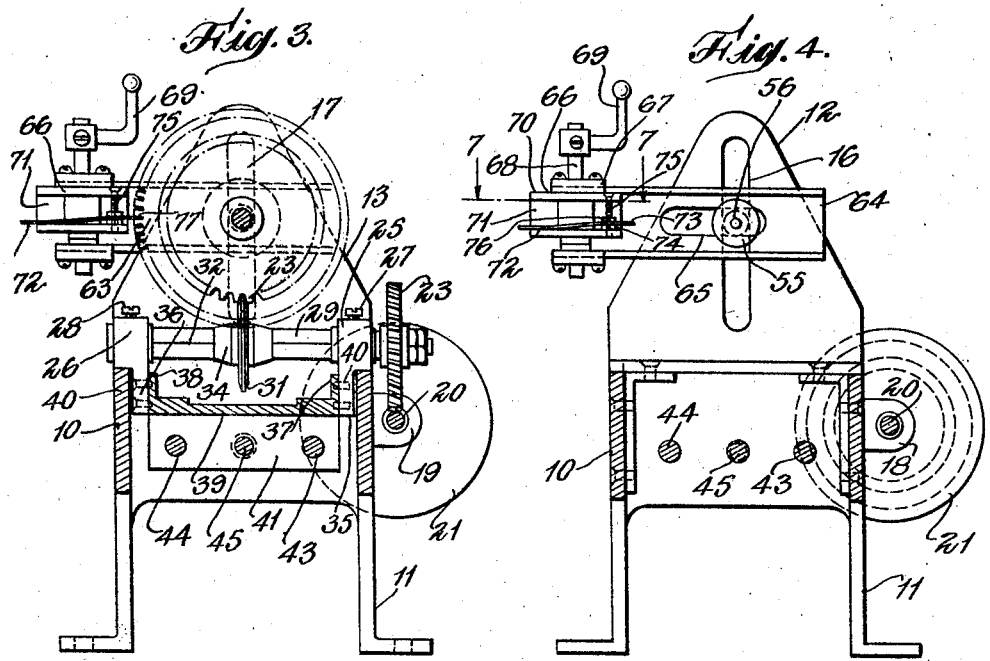
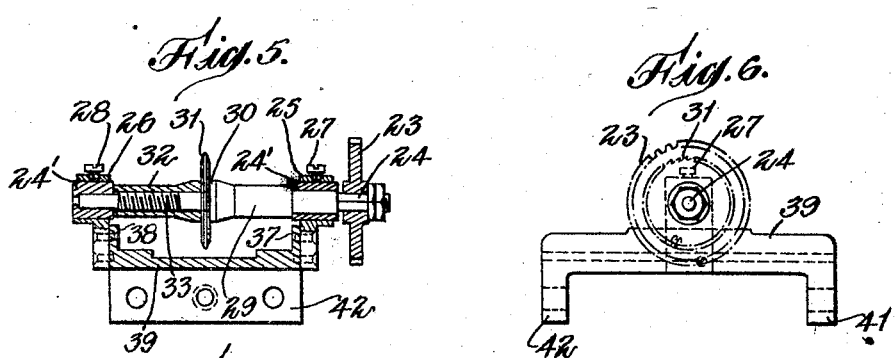
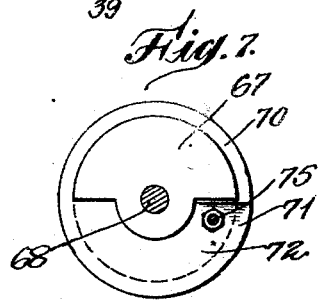
Inventor  
Edward Konik  
by his Attorney

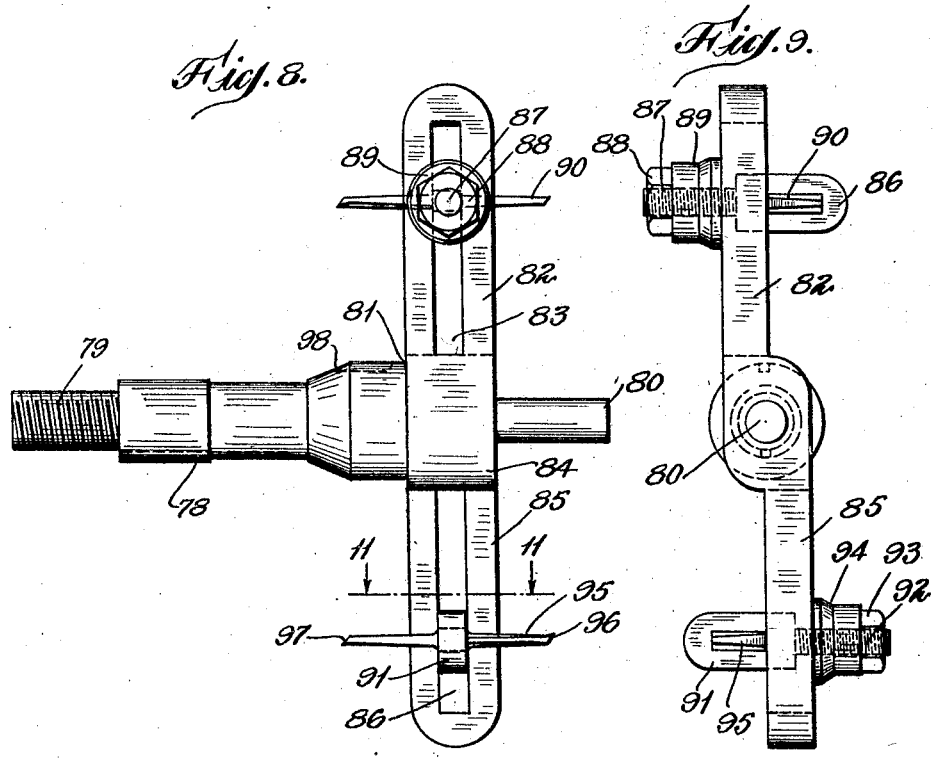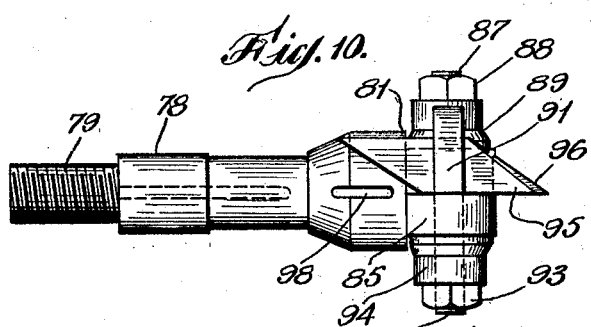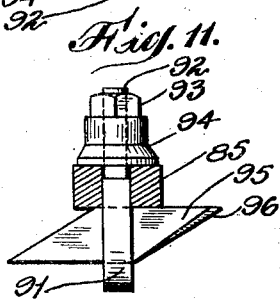

Patented May 11, 1926.

1,584,308

UNITED STATES PATENT OFFICE.

EDWARD KONIK, OF NEW YORK, N. Y.

GEAR-CUTTING MACHINE.

Application filed February 10, 1925. Serial No. 8,203.

This invention relates to improvements in gear cutting machines, particularly machines of comparatively small dimensions, and it is the principal object of the invention to provide a machine of this type permiting the cutting of a plurality of gears at one time.

Another object of the invention is the provision of a machine in which the rotating cutter is axially traveling and is exchangeably held in a novel and improved manner.

A further object of the invention is the provision of a gear cutter of simple and inexpensive construction, yet operating positively and effectively.

A still further object of the invention is the provision of a gear cutter adapted to be shifted manually as well as operated by a motor.

It is also one of the objects of the present invention to provide a gear cutter with means for accurately governing the number and size of the gear teeth to be cut into the blanks.

The machine moreover allows a ready adjustment for the cutting of gear teeth in blanks of varying diameter, and the collection of the chips in or by a sliding carriage executing a reciprocatory motion in axial direction below the cutting tool.

These and other objects and advantages of my invention will become more fully known as the description thereof proceeds, and will then be more fully disclosed in the appended claim.

In the accompanying drawing, forming a material part of this disclosure:

Fig. 1 is a side elevation of a gear cutting machine constructed according to the present invention.

Fig. 2 is a top plan view therof.

Fig. 3 is a vertical section through the machine on line 3—3 of Figure 1.

Fig. 4 is another vertical section through the machine on line 4—4 of Figure 1.

Fig. 5 is a detail sectional view of the cutting tool and its holder.

Fig. 6 is an end view thereof.

Fig. 7 is a top plan view, partly in section on line 7—7 of Figure 4 of the gear teeth regulator.

Fig. 8 is a side elevation of a blank cutting tool.

Fig. 9 is an end view thereof.

Fig. 10 is a top elevation thereof.

Fig. 11 is a section on line 11—11 of Figure 8.

The machine constructed according to the present invention comprises a base 10 of any suitable size, shape and construction on feet 11 adapted to rest upon or to be secured to any suitable support.

Upon the base, approximately at the ends thereof, two standards 12, 13 of convenient shape as for instance as shown, approximately V-shape, are secured with their angular foot flanges 14, 15.

The standards 12, 13 are provided with longitudinal slots 16 and 17 respectively for a purpose to be more fully described hereafter.

Bearings 18, 19 are attached to the end walls of the base 10 and projected beyond the front wall thereof. In these bearings the ends of a worm shaft 20 are journaled, which projects at one end through bearing 20 and carries a pulley 21 for a motor driven belt and a pulley 21 of smaller diameter.

The worm shaft 20 is engaged by a worm wheel 23 or the like at the outer end of a transverse knife shaft or tool carrier, generally designated 24 and projecting beyond the front of the base.

The shaft 24 has its ends journalled in sleeves 24′ within bearing blocks 25, 26 open at their ends and which are held within these bearing-blocks by means of screws 27, 28 or the like.

One end of the shaft 24 is permanently encased within a sleeve 29 on which an abutment or shoulder 30 is formed which is engaged by a milling cutter 31 exchangeably held in its position against abutment 30 by means of a removable sleeve 32 adapted to be screwed upon the threaded part 33 of shaft 24 or to be unscrewed therefrom and which is provided with a disc engaging abutment or shoulder 34. In this manner a ready exchange of the tool or gear cutter 31 is possible.

The blocks 25 and 26 are shouldered and adapted to slide on top of the front and rear bars of the base 10. These blocks have depending flanges 35, 36 adapted to glide along the inner walls of the base frame, and to these depending flanges the upstanding side flanges 37, 38 of a slide or carriage 39 for the reception of the chips are secured by bolts 40 or the like. The carriage 39 has depending end flanges 41 and 42, each provided with three openings through two of which pass the bars 43 and 44 parallel to the sides of the base and secured with their outer ends in the end walls of the base.

The carriage 39 is sliding on and along these bars 43 and 44, and is moved in one and the other direction by means of a central threaded bar 45, the ends of which are journaled in the end walls of the base, one of these ends projecting over the respective end wall of the base, and carrying a crank 46 for the manual operation of said bar 45 to displace the carriage and the knife holder in one or the other direction, longitudinally to the base, as will be evident from the drawing.

The carriage 39 and knife above the same travel in unison, and it will be clear that all chips and dust will fall upon the carriage during the cutting of a gear.

The longitudinal slots 16, 17 in standards 12 and 13 allow a vertical adjustment of the tail and head stocks for the work-piece holder.

The tail stock comprises a screw 47 having a pointed inner end adapted to engage in a conical bore at the end of the work-piece holder, and passing through a threaded socket-nut 48 and washers 49, 50, one on each side of standard 13, and carries a locking nut 51 bearing against washer 50. It will be clear that in this manner an adjustment of the tail stock in the usual well known manner in vertical direction is possible, whereafter the parts are locked in their adjusted position by means of the nut 51.

The head stock comprises also a screw 52 having a pointed inner end engaging a conical bore or depression in the end of the work-piece holder, the screw passes through a threaded sleeve 53 and washers 54 and carries at its inner end a locking nut 55.

The work-piece holder comprises a shaft or round bar 56 which carries near one of its ends an abutment or collar 57 adapted to be engaged by the work-piece 58 held in place on shaft 56 by means of a sleeve 59. The end of shaft 56 is screw-threaded, as at 60, and is adapted to receive a sleeve 61 having an inner thread, and an outer reduced hexagonal end part 62 adapted to be engaged by a wrench. It will be clear that if more than one work piece is to be cut by the knife, sleeve 59 is dispensed with, and shorter sleeves of a suitable number are used on shaft 56 to separate each two of the work-pieces.

Near the head stock, the shaft 56 carries a pattern wheel 63 and between the wheel and the standard 12, the shaft 56 carries a transverse member 64 of substantially U-shaped cross-section having a longitudinal slot 65 in its head-bar through which shaft 56 extends. Locking member 55 allows a locking of member 64 in any of its adjusted positions relative to shaft 56.

At its rear end the U-member 64 carries a gage, generally indicated at 66 which comprises a bracket 67 attached by means of screws or the like to the U-element 64 which has a central opening through which a vertical stub shaft 68 extends projecting above the upper face of the bracket 67 and having attached thereto a crank arm 69 as illustrated in Figure 4.

The shaft 68 extends downwardly through a drum 70, open as at 71 by cutting away part of its side wall.

In this drum a thin spring disc 72 is held within a circular slot between side and bottom walls of the drum. At one point opposite to the point of holding, the disc 72 extends beyond the bottom and side walls of the drum, as indicated at 73, and near this point the disc is supported by a nut 74 resting upon the bottom plate and secured at the lower end of a screw bolt 75 which carries also a nut 76 above spring disc 72, thus providing for an adjustment of the distance of the spring disc from the bottom of drum 70 for a purpose later more fully to be described. The active edge of disc 72 is provided by a radial slit adjacent screw 75 to enable the edges opposite to the slit to be off set by the screw to vary the helixangle or pitch.

The outer projecting end of the spring disc is adapted to engage between the teeth of pattern or gage wheel 63, as indicated at 77 in Figure 3.

In Figures 8 to 11 inclusive, a tool for cutting the blanks to be worked upon by the gear cutter from a piece of raw material such as a metal plate is shown.

This tool comprises a shaft 78 having a reduced end provided with screw thread 79 by means of which it is adapted to be attached to a machine for rotating the tool with a certain predetermined speed. The opposite end of shaft 79 is also reduced as indicated at 80 and fit to be inserted into a suitable opening in the plate of raw material, and part 80 has a smooth outer face.

The shaft 78 has an abutment formed at its inner end adapted to be engaged by the side face of a cross-bar 82 having a longitudinally extending slot 83, and a centrally located shoulder 84 on its upper as well as on its lower sides in different planes. From the lower face of shoulder 84 extends an arm 85, also equipped with a longitudinal slot 86. In the slot 83 a loop-element 86, having its part oppositely disposed to the loop formed into a threaded bolt 87, is guided, and adapted to be secured in any of its adjusted positions in the slot 83 by means of a nut 88 engaging a washer-sleeve 89 on bolt 87.

Through the loop-element 86 a cutter tool 90 is transversely guided and firmly held therein in position by the proper adjustment of nut 88.

A similar looped element 91, having a threaded bottom or bolt end 92 is passed through the slot 86 in arm 85, however from the side opposite the element 86. This bolt 92 carries also a locking nut 93, and a sleeve washer 94 by means of which a cutter knife or router 95 is held in place in its position in the slot of the loop-element 91, through which it is passed transversely, by the proper adjustment of nut 93.

Each of the knives 90 and 95 has a rhomboid body carrying cutting edges 96 slanting towards opposite sides as at 97 and 97'. The cross-bar 82 is made integrally with shaft 78 and has lateral strengthening ribs or the like engaging slots or depressions 98 in the shaft 78.

The device operates as follows:

If it is desired to cut out a number of blanks for cutting gears, the tool is attached with its shaft 78 by screwing its threaded part into a rotating part of a machine, while the smooth part 80 is fitted into a suitable hole provided therefor in the plate of raw material and later forming the central opening of the blank disc to be cut as a gear. If now the tool is rotated, the knife edges 96 will cut out a circular blank from the material. The size of this blank is determined by the adjustment of the knife holders in the slots of arms 82 and 86 in an evident manner.

The blank thus cut out, or any number of such prepared blanks, preferably eight, which are to be provided with peripheral gear teeth, are then placed onto the work-piece holder with the hindmost disc in engagement with the collar 57, while the front or foremost blank is pressed against its neighbor on the shaft of the holder by means of the sleeve 61 in a well known manner. Then the work-piece holder and the blanks thereon are brought into the machine so that the pointed inner ends of the tail and head stock screws engage into the conical depressions in the ends of the holder shaft.

Now the adjustment of the holder and work-pieces or blanks thereon to a suitable height or distance relative to the knife disc 31, according to the size of the blanks to be cut is effected by the proper adjustment of the holding screws in the longitudinal slots of the standards 12, 13, whereafter the parts are locked in their relative adjusted positions by means of the nuts 51 and 55.

It will be clear that the exchange of the approximately circular cutter knife can readily be effected by means of its shaft which after the release of the sleeve may be pushed through one of the sockets at one end, until its opposite end comes free from its sleeve.

The size and number of the teeth to be cut in a blank is regulated by means of the proper adjustment of the spring plate or disc 72 above the bottom of the drum and nuts 74, 76 and by bringing the rim of the disc protruding above or beyond the drum into engagement with the teeth of wheel 63 by the proper adjustment of the U-piece 64 which is then locked in its adjusted position by nut 55.

It will be clear that the reciprocatory operation of the cutter disc or knife 31 is effected by means of a motor driven belt running over the pulleys at the end of the worm shaft 20 or even by hand by the proper manipulation of crank 46. The waste and chips of metal will fall upon the carriage 39.

If one tooth groove has been cut simultaneously into all of the work blanks on the work-piece holder shaft, the gage 66 is set again by hand for the engagement between two other teeth of the wheel 63 by hand or this adjustment may also be effected by a proper part on the machine automatically.

It will be clear that in the above manner a comparatively small and handy machine has been constructed particularly well adapted for watchmakers etc. which positively and effectively cuts successively any desired number and size of gear teeth into a blank which previously has been prepared and cut from the material by the use of the cutter or routing tools.

It is to be understood that changes such as fall within the scope and spirit of the invention as laid down in the appended claim, may be made without departing from the scope of the invention.

Having thus described my invention, what I claim as new, and desire to secure by Letters Patent, is:

In a gear cutter of the class described, a base, pairs of standards having longitudinal, vertical slots on said base, a head and tail stock adapted to be adjusted in vertical direction in the slots of said standards, means for locking said parts in their respective adjusted positions, a work-piece holder held between said head and tail stocks, a U-member having a horizontal slot, a work-piece holder having a shaft passing with one of its ends through the slot in said U-member, means for locking the parts in their adjusted position, a gear wheel on said shaft adjacent to said U-element, a means carried by said U-element and adapted to be engaged by said gear wheel allowing a determination of the number and depth of the teeth to be cut in the work piece or blank, and means for cutting gear teeth in said blank.

Signed at New York, in the county of New York and State of New York, this 4th day of February A. D. 1925.

EDWARD KONIK.